United States Patent [19]

Vansant et al.

[11] Patent Number: 4,641,402
[45] Date of Patent: Feb. 10, 1987

[54] BRANCH-OFF CLIP AND ASSEMBLY

[75] Inventors: Jan Vansant, Leuven; Noel M. M. Overbergh, Bertem, both of Belgium

[73] Assignee: N.V. Raychem S.A., Kessel-lo, Belgium

[21] Appl. No.: 556,211

[22] Filed: Nov. 28, 1983

[30] Foreign Application Priority Data

Nov. 29, 1982 [GB] United Kingdom ............... 8234001

[51] Int. Cl.⁴ ............................................. B29C 27/24
[52] U.S. Cl. ........................................ 24/703; 24/570
[58] Field of Search ............... 24/30.5 R, 30.55, 67.3, 24/67.9, 530, 545, 546, 563, 570, 571; 174/74, DIG. 8; 156/85, 86; 269/254 R; 403/273

[56] References Cited

U.S. PATENT DOCUMENTS

| 4,246,687 | 1/1981 | Nolf | 174/DIG. 8 |
| 4,298,415 | 11/1981 | Nolf | 156/85 |
| 4,400,579 | 8/1983 | Nolf | 174/DIG. 8 |
| 4,410,379 | 10/1983 | Franckx | 174/DIG. 8 |
| 4,413,922 | 11/1983 | Nolf | 174/DIG. 8 |
| 4,420,654 | 12/1983 | Müller | 174/DIG. 8 |
| 4,438,294 | 3/1984 | Meltsch et al. | 174/88 R |
| 4,467,137 | 8/1984 | Paget | 174/88 R X |

FOREIGN PATENT DOCUMENTS

| 0094242 | 5/1983 | European Pat. Off. . |
| 0094793 | 5/1983 | European Pat. Off. . |
| 3105471 | 9/1982 | Fed. Rep. of Germany . |

Primary Examiner—Peter A. Aschenbrenner
Attorney, Agent, or Firm—T. Gene Dillahunty; Herbert G. Burkard

[57] ABSTRACT

A branch-off seal between a recoverable sleeve and two or more substrates is effected using a clip the outer legs of which are positioned over the outer surface of the sleeve so as to form an appropriate number of conduits. The clip is provided with an inner leg comprising a heat-activatable sealing material and a heat-conductive member or region. The dimensional integrity of the member or region weakens on activation of the sealing material. Thus the amount of heat or mechanical rigidity between the substrate is limited.

7 Claims, 6 Drawing Figures

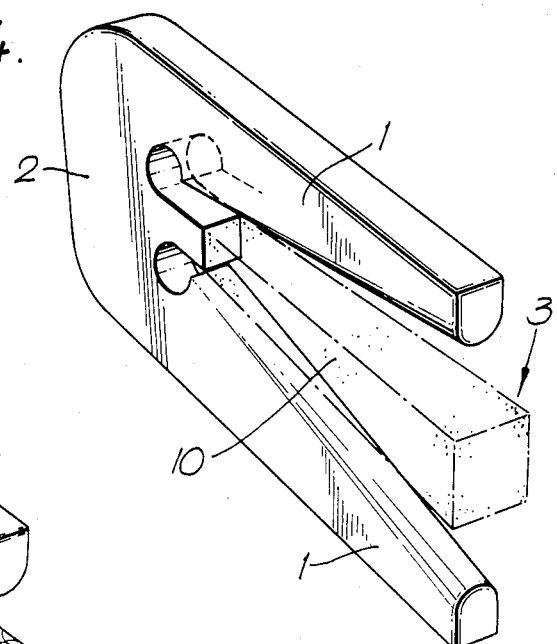
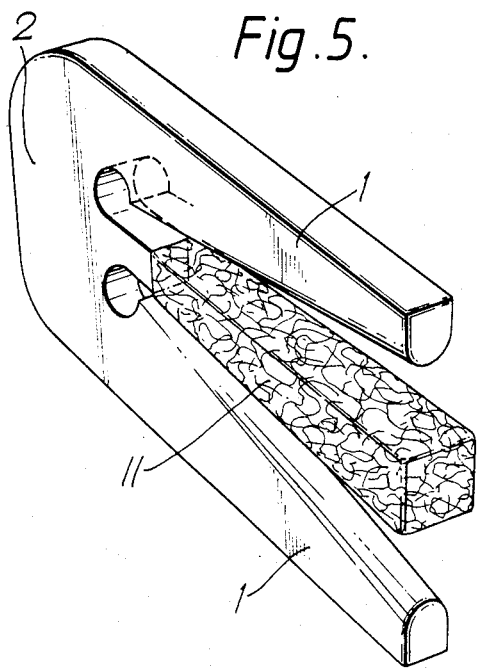
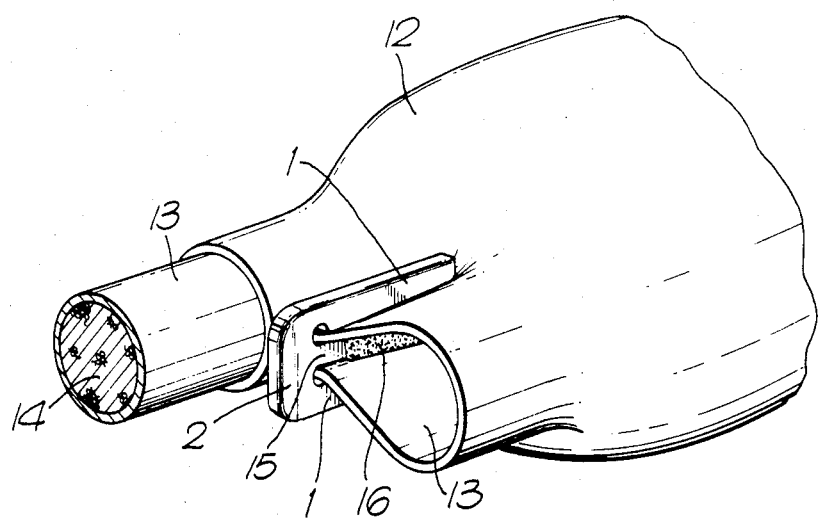

BRANCH-OFF CLIP AND ASSEMBLY

FIELD OF THE INVENTION

This invention relates to the use of heat-recoverable articles in enclosing and protecting joins or splices between substrates such as supply lines.

BACKGROUND OF THE INVENTION

Heat-recoverable articles, such as heat-recoverable sleeves, are useful for forming enclosures around substrates to be insulated or protected because the article can be made large enough for easy installation, and then recovered into close contact with the substrate. Close tolerances in manufacture and craft-sensitivity in installation can therefore be avoided.

A heat-recoverable article is an article the dimensional configuration of which may be made substantially to change when subjected to heat treatment.

Usually these articles recover, on heating, towards an original shape from which they have previously been deformed but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962, 3,086,242 and 3,597,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat unstable form in a separate stage.

In the production of heat recoverable articles, the polymeric material may be cross-linked at any stage in the production of the article that will enhance the desired dimensional recoverability. One manner of producing a heat-recoverable aricle comprises shaping the polymeric material into the desired heat-stable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape.

In other articles, as described, for example, in British Pat. No. 1440524, equivalent to U.S. Pat. No. 4,168,192, tubular member is held in a stretched state by a second member, such as an inner tubular member, which, upon heating weakens and thus allows the elastomeric member to recover.

Heat shrinkable sleeves find many applications, especially in the connection and termination of wires, cables and pipes. However, there are other applications where it is desirable to provide a connecting, insulating, or protective heat-recoverable member for elongate objects such as cables and pipes where the ends are not accessible, or if they are accessible, where it is undesirable to disconnect or otherwise to displace them. For such applications the so called "wrap-around" sleeves have been developed. Basically, they are heat-recoverable sheets which can be wrapped around the substrate to form a generally tubular shape and which in general are provided with fastening means for holding them in the wrapped-up configuration during recovery. Typically such fastening means are mechanical and comprise, for example, rigid clamps, pins or channel members which co-operate with suitably shaped moulded or extruded protuberances adjacent to the overlapping edges of the recoverable sheet. Various types of fastening means are described, for example, in U.S. Pat. No. 3,379,218 and British Pat. Nos. 1155470, 1211988 and 1346479 equivalent to U.S. Pat. Nos. 3,455,336, 3,542,077 and 3,770,556, respectively. In other applications, however, the sheet may be held in the wrapped-up configuration during recovery by means of an adhesive which may, in some cases, be applied on site.

Heat recoverable sleeves have been successfully employed in many fields of application. However, when two or more substrates such as supply lines, for example cables or pipes, are joined so as to form a connection, problems may arise in obtaining an adequate seal, for example at the outlet of a heat recoverable enclosure. Amongst areas in which this problem is typically encountered there may especially be mentioned the outlets of the splice cases described and claimed in British Pat. equivalent to U.S. Pat. No. 4,142,592, 1401167 and the duct seal devices described and claimed in British Pat. No. 1594937, equivalent to U.S. Pat. No. 4,268,041.

One effective solution for tubular sleeves has been to use moulded heat-shrinkable parts provided with preformed outlets for the individual supply lines. However, in general such moulded parts have to be made to suit a specific application. Their versatility has been improved by the use of end caps which seal outlets which are not needed in a specific operation, as described and claimed in British Pat. No. 1594693 but they are nonetheless expensive and thus economically infeasible in many routine applications.

Another, less expensive, solution which has frequently been employed is to use mastic tape to seal the gap between the supply lines so that, on recovery, a proper encapsulation is formed at the end of the heat-recoverable part. However, the use of such tape requires skill on the part of the installer and the method is not applicable to large parts. In addition, the mastic may degrade the overall performance of products which are provided with an inner lining or coating of a hot-melt adhesive.

In British Pat. No. 1604981, equivalent to U.S. Pat. No. 4,298,415, (the disclosure of which is incorporated herein by reference) an effective branch-off is obtained by forming the individual outlets by means of a suitably shaped clip made from a relatively rigid material. In accordance with the invention therein described there is provided a method of forming a branch-off seal between a heat-shrinkable sleeve and at least two substrates such as supply lines, which comprises the steps of (a) positioning a clip having at least two elongate legs over the outer surface of the heat-shrinkable sleeve at the end thereof so as to form at least two terminal conduits; (b) positioning the substrates within the conduits; and (c) applying heat so as to effect shrinkage and to form the desired seal. Steps (a) and (b) may be effected in either order or simultaneously, for example in many cases the clip will be pushed into place after the sleeve has been positioned around the substrates.

In its simplest form the clip used in the invention of British Pat. No. 1604981, equivalent to U.S. Pat. No. 4,298,415, is U-shaped and its two legs are slid over the outer surfaces of the pinched together heat-recoverable sleeve or wrap-around sleeve, or over the surfaces of the heat-recoverable sleeve or wrap-around sleeve and another co-operating surface. However, in preferred embodiments the clip has three legs and the inner leg passes into the heat-recoverable sleeve whilst the outer legs pass outside it; in this way each of the two layers of the heat-recoverable material is pinched between an inner leg and an outer leg. The inner leg may be contoured so as to reduce the possibility of the clip "milking-off" during recovery, and advantageously comprises a hot-melt adhesive which flows during recovery to seal the gap between the conduits which have been formed.

SUMMARY OF THE INVENTION

We have now designed branch-off clip which possess many of the advantages of the three legged clip described above, as regards positioning of the clip, delivery of sealant material to the cable crutch region, activation of such adhesive if necessary etc, but which can facilitate re-entry of an enclosure and which can reduce craft-sensitivity when used with less rugged substrates.

Thus, the invention provides a clip which comprises at least two outer legs and an inner leg, so arranged that the clip can be positioned over the outer surface of a recoverable sleeve at an end thereof with the outer legs outside the sleeve and the inner leg inside the sleeve; the inner leg comprising a heat-activatable sealing material, and a heat conductive member or region thermally connecting the outer legs with the sealing material, the dimensional integrity of at least part of the member or region weakening on heating at or shortly after activation of the sealing material, thus reducing the thermal connection, or reducing the rigidity of at lease a portion of the central leg, or both.

Before heating, the inner leg of the clip comprises a hot-melt adhesive, a softenable sealant such as a mastic, or other heat-activatable sealing material, and a heat conductive member or region by means of which heat directed at those parts of the clip outside of the sleeve will be transferred within the sleeve to melt the adhesive, thereby sealing the crutch region between the cables. The embodiments of three legged clips hitherto described show the inner leg to be generally integral with and substantially similar to the outer legs. Such an inner leg can act as a support for adhesive and can conduct heat into the crutch region to melt the adhesive. Although this conduction of heat is desirable it may occasionally result in damage to the cable jacket or other substrate especially where long post-heating times are employed. Heat directed at the outside of the sleeve in this instance is conducted through the material of the clip to the inner leg which is in contact with the cable jackets, and with low quality cables this can cause damage. Also pressure of the outer sleeve causes the cables and clip to be forced together, and this may cause damage where the inner leg is rigid. These thermal and mechanical effects can be overcome by the invention by causing heat transfer to the inner leg to be cut or considerably reduced at a certain point in time during installation, or by causing at least a portion of the inner leg to become more flexible.

A second consideration of three legged clips also results from a feature which is generally beneficial but can in certain circumstances be disadvantageous. UK Pat. No. 1604981, equivalent to U.S. Pat. No. 4,298,415, remarks that a three legged clip allows easy positioning at the end of a sleeve and makes milk-off practically impossible especially after recovery. The reason for this is that the inner leg, especially when tapered towards its proximal end, becomes wedged between the recovered sleeve and the substrates. This permanence is in general to be preferred, but where the enclosure is likely to be re-entered sometime during its life difficulty in removing the clip can be troublesome. With the present invention a seal, equally as reliable as the prior art seals, can be made which allows easy re-entry, due to transformation of, say, a three legged clip into a two legged clip whilst still benefitting from the provision of a heat-conductive member or region. If the heat conductive member or region were simply omitted the heat-activatable sealing material would not be properly activated, except perhaps at a position adjacent the open end of the sleeve.

BRIEF DESCRIPTION OF THE DRAWINGS

FIGS. 4 and 5 show a branch-off clip according to this invention wherein the center leg is filled with a thermally conductive material.

FIG. 6 shows an assembly of a branch-off clip according to this invention and a heat recoverable sleeve.

DETAILED DESCRIPTION OF THE INVENTION

Figure 1:
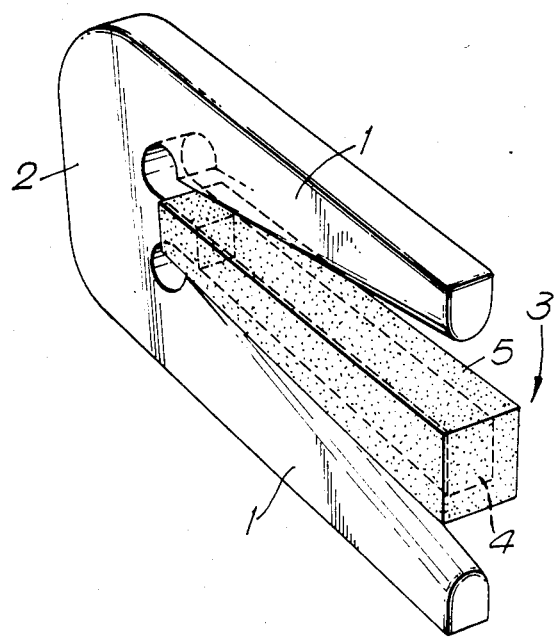
FIG. 1 shows a branch-off clip according to this invention having a low melting center leg.

Three preferred techniques will now be discussed by means of which one can achieve the desired weakening of dimensional integrity of the heat conductive member or region of the inner leg. What is preferred is that installation is commenced with a three-legged clip, but that the clip effectively becomes a two-legged clip at some stage during installation. The inner leg will not in general totally disappear: the heat conductive member may remain but in a dispersed form or it may simply move so as to conform to the shape of the cables or other substrates or it may move further away from the bridge part of the clip into a region of the sleeve of larger diameter. The timing of this change should be such that the heat conductive member or region is able to conduct a sufficient amount of heat to cause melting of the adhesive (or activation of other sealing material) but is not able to damage the cables. Weakening of the heat conductive member or region should therefore occur shortly after sufficient adhesive in the crutch region has melted or has otherwise been activated. The delay between activation of adhesive and reduction of the heat path or reduction of rigidity in this embodiment is preferably from almost nothing to, say, 10 minutes depending on the means of heating employed. The adhesive is preferably activated at a temperature of from 50°–120° C., more preferably 70°–100° C. and weakening of dimensional integrity preferably occurs within the range 70°–140° C. more preferably 90°–120° C. The difference between the two temperatures is preferably from 5°–35° C., more preferably from 5°–15° C.

In a first embodiment, the heat conductive member or region comprises a low-melting point metal. Preferably the melting point will be slightly above the activation temperature of the adhesive. Not only should the temperature of melting be considered, but also the amount of heat required should be correlated to the amount of heat required for recovery of the sleeve and for activation of the adhesive or other sealing material. As soon as the heat conductive member or region of the inner leg weakens, for example by melting, the heat-conductive path between the outer legs, or other parts of the clip which are directly heated, and the crutch region is broken or at least substantially reduced. In general the material that melts will simply flow and become dispersed in the crutch region: the clip could however be designed such that the molten material flowed in a chosen direction.

The construction of this first embodiment can be realised in a number of ways. Firstly, the heat conductive member or region could be a complete prong of low melting-point metal, of much the same shape and size as the outer legs. The term prong is used for a conductive member of this general configuration because the term inner leg is used to refer to the conductive member or region together with the sealing material. At the appropriate stage during heat-recovery the whole of the prong would melt, leaving molten sealing material in the crutch region but preventing or reducing further flow of heat into the region. Not only is there no further flow of heat to damage the substrates, but the hot conductive member no longer has the dimensional integrity to be forced against the substrates.

A second design using a low melting point metal as the heat conductive member or region employs a central prong which does not melt, the low melting point metal being used as a bond to join this prong to the remainder of the clip. During installation, therefore, the prong becomes detached causing a break or substantial reduction in the heat path. The dimensional integrity of the inner leg, considered as a whole, is weakened but there remains the non-melting prong, which may but need not remain in the crutch region. It will be appreciated that other fusible materials having a significant heat conductivity may be used in this design instead of the low melting point metal.

In a third design, a plug of low melting point metal is provided in the body of the clip somewhere in the heat path from the outer legs to a non-melting central prong. A convenient place for the plug is towards the proximal end of the prong or in a bridging part joining together the two outer legs. If the size of this plug is significant compared to the thickness of the clip at the position where the plug is set, then the heat conductivity through the clip will be predominantly due to heat conductivity through the plug. The plug melts during installation, and is dispersed, thus cutting off further supply of heat to the prong.

In a second embodiment, the heat conducting member or region is dispersed throughout the sealing material in the form of metal fibres or mesh. The heat conductive member thus has little or no (bulk) dimensional integrity itself, but has the required rigidity in conjunction with solid or un-softened sealing material. Once the sealant has softened or melted, the fibres of metal may for example no longer be held sufficiently close to one another to allow passage of a significant amount of heat. Also, as in the first design above where the prong melted, there is no rigidity after the desired period of time and substantially less mechanical force applied to the cables. The heat-conductive member may comprise a thermally conductive material (preferably a metal) in the general form of a coil spring or helix extendinge along the length of the inner leg and extending through the sealing material. On heating, the sealing material becomes less rigid and the spring or helix is able to flatten or tighten in response to any force exerted on it. Thus, the heat-conductive member does not present a rigid outer surface which could damage a substrate such as a poor quality cable.

The third embodiment to be described is similar to the second in that a heat-conducting material is dispersed throughout a sealing material. Here, however, the inner leg comprises a metal powder, for example copper powder, dispersed throughout a sealing material such as a hot-melt adhesive.

The clips of the present invention can incorporate additional features for example: the outer legs can be provided with a sinusoidal or saw-tooth profile to reduce milk-off; the clip can be provided with a temperature indicating device to show when sufficient heat has been applied to activate sealing material in the crutch region; the clip can incorporate a valve or other secondary component; the outer legs can move together before during or after heating to enhance grip on the recoverable sleeve; and the clip can have means such as laterally extending ears by means of which it can be removed from the sleeve, or by means of which it can be properly located with respect to the substrates. Other features which may be applied to the clip of the invention are disclosed in UK Pat. No. 1604981. The temperature indicating device, which may be a thermochromic paint or a mechanical device, may be used to indicate when the sealing material has been properly activated, when the inner leg was weakened, or more usually both of these changes. A suitable mechanical device is a spring set in the inner leg in a resiliently biased state and having a marker that projects outside the sleeve when in use. When the sealing material softens or melts (or is otherwise activated) or when the prong melts, the spring reverts to its relaxed state causing visible movement of the marker.

The invention will now be further illustrated with reference to the accompanying drawings.

FIGS. 1-5 show a three legged clip comprising two outer legs 1 interconnected by a bridge portion 2 which also bears an inner leg 3.

In FIG. 1, the inner leg comprises a heat-conducting, low melting point, prong 4 coated with a heat-activatable sealant 5.

Figure 2:
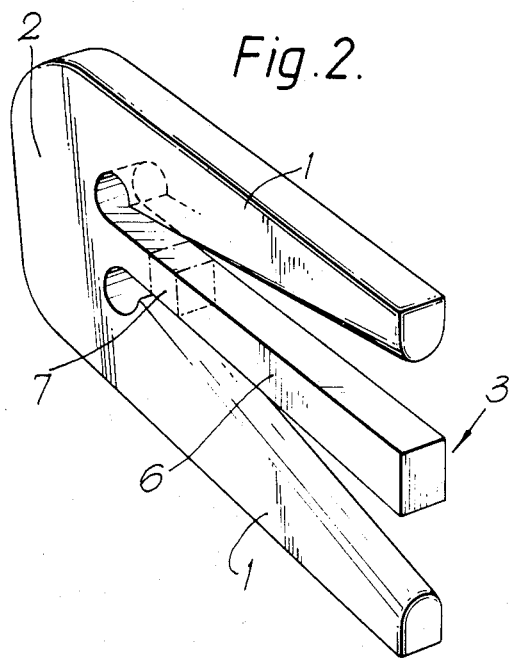
FIG. 2 shows a branch-off clip according to this invention having a low melting bridge for the center leg.

The inner leg in FIG. 2 comprises a non-fusible prong 6 joined to the bridge portion 2 by a bond 7 which fails on heating. The inner leg would also possess a heat-activatable sealing material, but this has been omitted for clarity. The bond 7 is conveniently a solder or other low melting point metal. The precise location of the bond 7 is not critical providing that it lies in the heat path from the outer legs 1 or bridge 2 to a significant part of the prong 6. The thickness of the material constituting the bond 7 is preferably large enough so that when it melts there is no liklihood of the prong 6 touching the bridge 2.

Figure 3:
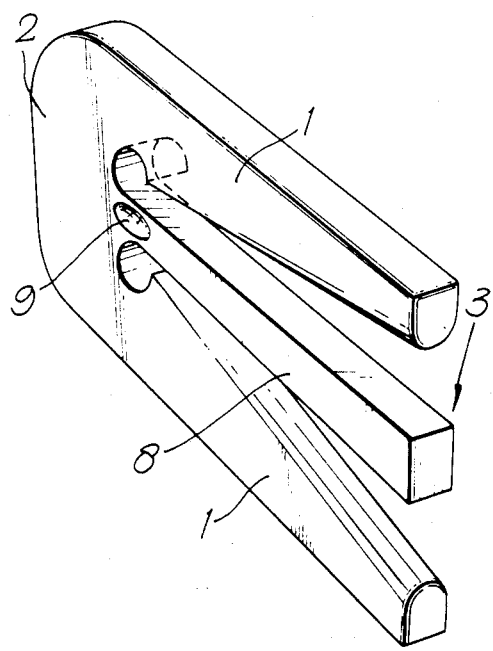
FIG. 3 shows a branch-off clip according to this invention wherein a portion of the bridge is a low melting material.

In the embodiment of FIG. 3, the prong 8 does not melt, and remains attached to the bridging portion 2. The heat path from the outer legs 1 or bridge 2 is however interrupted by melting of a plug 9. As before, sealing material has been omitted for clarity. The plug 9 is of a significant size with respect to the part of the clip where it is situated (here the proximal end of the prongs 8) and therefore heat conduction to the inner leg is considerably reduced when the material of the plug melts and is dispersed.

FIG. 4 shows an inner leg 3 comprising a sealing material 10 having dispersed throughout its bulk a metal powder, which is represented by stippling.

FIG. 5 is similar to FIG. 4, but the dispersed heat-conducting material is a metal mesh or fibre.

A branch-off clip is shown in use in FIG. 6. The clip has been positioned at the end of a sleeve 12 in order to form two terminal conduits 13. A substrate 14 is shown in one of these conduits, the other conduit has been left empty for a better view of the clip. The two outer legs 1 hold circumferentially spaced portions of the sleeve together to form the conduits, and the inner leg 15, only a stub of which remains after heating, extends into the sleeve to deliver sealing material to the crutch region 16. In the early stages of heating, the inner leg 15 is able to conduct heat to the crutch region from the outer legs 1 and the bridging portion 2 over which a propane torch, for example, could be played. One can see from FIG. 6 that if the inner leg were to retain its original configuration it may be forced against the substrates 14 due to shrinkage of the sleeve 12. Where the substrates are not sufficiently heat-resistant this could cause damage, and in any case introduces craft sensitivity since the workman must be careful not to continue heating for too long after recovery. Some post-heating is often necessary to ensure all sealing material has been activated, but excessive post heating can cause damage. The problem is substantially avoided using the clip of the present invention since proper activation coincides with or is shortly followed by breaking of the heat path to the crutch region. As mentioned above, in the preferred embodiments, there is not only a break in the heat path, but also a failure of dimensional integrity of the whole of the inner leg.

What is claimed is:

1. A clip which comprises at least two outer legs and an inner leg, so arranged that the clip can be positioned over the outer surface of a recoverable sleeve at an end thereof with the outer legs outside the sleeve and the inner leg inside the sleeve; the inner leg comprising a heat-activatable sealing material, and a heat conductive means for conducting heat from the outer legs to the sealing material, in which the heat conductive means comprises a metal prong which substantially entirely melts at or shortly after activation of the sealing material and wherein the dimensional integrity of at least part of the heat conductive means weakens on heating at or shortly after activation of the sealing material, thus reducing the thermal connection, or reducing the rididity of at least a portion of the inner leg, or both.

2. A clip which comprises at least two outer legs and an inner leg, so arranged that the clip can be positioned over the outer surface of a recoverable sleeve at an end thereof with the outer legs outside the sleeve and the inner leg inside the sleeve; the inner leg comprising a heat-activatable sealing material, and a heat conductive means for conducting heat from the outer legs to the sealing material, in which the heat conductive means comprises a non-fusible prong and a bond which constitutes the thermal connection to the remainder of the clip, wherein the bond melts at or shortly after the activation of the sealing material and wherein the dimensional integrity of at least part of the heat conductive means weakens on heating at or shortly after activation of the sealing material, thus reducing the thermal connection, or reducing the rigidity of at least a portion of the inner leg, or both.

3. A clip which comprises at least two outer legs and an inner leg, so arranged that the clip can be positioned over the outer surface of a recoverable sleeve at an end thereof with the outer legs outside the sleeve and the inner leg inside the sleeve; the inner leg comprising a heat-activatable sealing material, and a heat conductive means for conducting heat from the outer legs to the sealing material, in which the heat conductive means comprises a non-fusible prong mechanically joined to the outer legs and having at a distal porton a fusible plug which melts at or shortly after activation of the sealing material and wherein the dimensional integrity of at least part of the heat conductive means weakens on heating at or shortly after activation of the sealing material, thus reducing the thermal connection, or reducing the rigidity of at least a portion of the inner leg, or both.

4. A clip which comprises at least two outer legs and an inner leg, so arranged that the clip can be positioned over the outer surface of a recoverable sleeve at an end thereof with the outer legs outside the sleeve and the inner leg inside the sleeve; the inner leg comprising a heat-activatable sealing material, and a heat conductive means for conducting heat from the outer legs to the sealing material, in which the sealing material has dimensional integrity before heating, and the heat conductive means comprises a metal powder dispersed through the sealing material and wherein the dimensional integrity of at least part of the heat conductive means weakens on heating at or shortly after activation of the sealing material, thus reducing the thermal connection, or reducing the rigidity of at least a portion of the inner leg, or both.

5. A clip according to claim 1, in which the sealing material has dimensional integrity before heating, and the heat-conductive means comprises a metal powder dispersed throughout the sealing material.

6. A clip which comprises at least two outer legs and an inner leg, so arranged that the clip can be positioned over the outer surface of a recoverable sleeve at an end thereof with the outer legs outside the sleeve and the inner leg inside the sleeve; the inner leg comprising a heat-activatable sealing material, and a heat conductive means for conducting heat from the outer legs to the sealing material, in which the sealing material has dimensional integrity before heating, and the heat conductive means comprises metal fibres dispersed throughout the sealant and wherein the dimensional integrity of at least part of the heat conductive means weakens on heating at or shortly after activation of the sealing material, thus reducing the thermal connection, or reducing the rigidity of at least a portion of the inner leg, or both.

7. A clip according to claim 6, in which the metal fibers constitute a mesh.

* * * * *